Nov. 10, 1959 — N. H. KRAMER — 2,911,947
ANIMAL LEASH
Filed Dec. 3, 1956
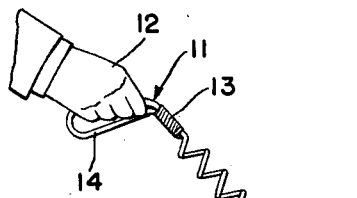
FIG. 1
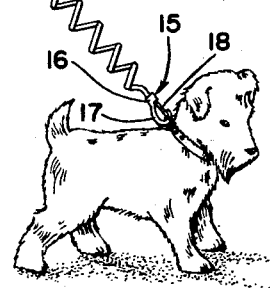
FIG. 2
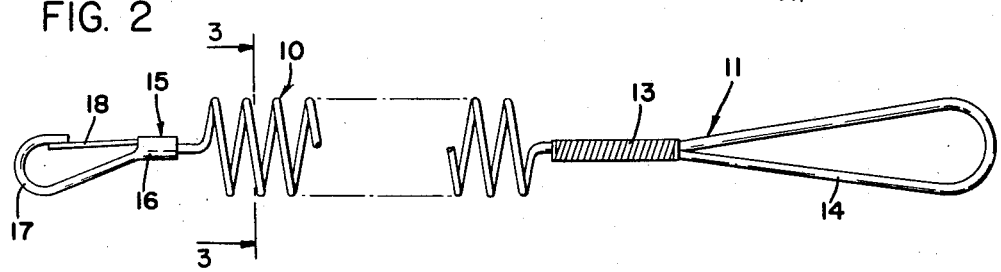
FIG. 3
FIG. 4
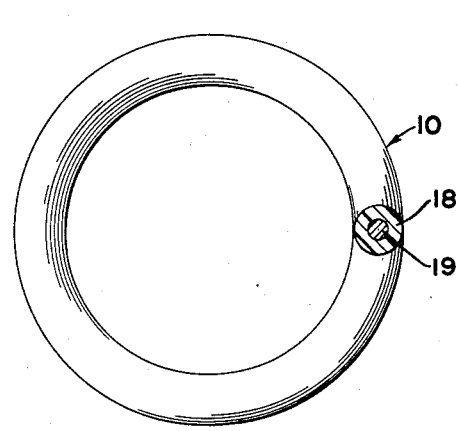
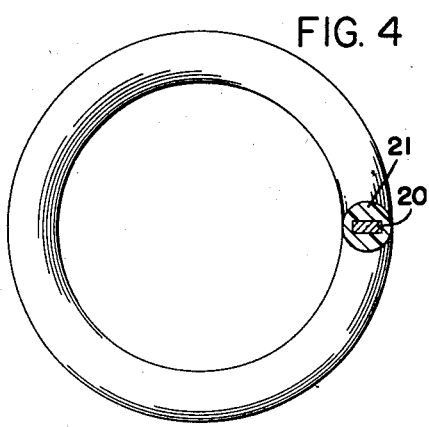
INVENTOR.
NELSON H. KRAMER
BY
Fay & Fay
ATTORNEYS

United States Patent Office 2,911,947
Patented Nov. 10, 1959

2,911,947

ANIMAL LEASH

Nelson H. Kramer, Warrensville Heights, Ohio

Application December 3, 1956, Serial No. 625,765

4 Claims. (Cl. 119—109)

This invention, relating as indicated to an animal leash, is particularly directed to an improved leash, especially for dogs, and has for its object a leash which will not become entangled in trees, shrubbery, bushes and the like. The leash also provides improved control when walking the dog and at the same time reduces the possibilities of injury to the animal when he becomes excited or when the leash is caught over one or more of his legs.

In connection with animal leashes, innumerable types have been developed with special control features, such as springs and the like, to prevent injury to the animal when he lunges at an object, and in general these types have not received very wide spread usage.

This invention particularly relates to a helical coil of spring steel and incorporates protective material in the nature of an abrasion-resistant material covering to prevent cutting action when around the legs of another animal or the legs and arms of a human being, and also prevents cutting in or damaging trees, outdoor furniture and the like.

This invention has for its particular object the idea of preventing sag in the leash so that there is a constant tension sufficient to overcome the greater portion of the natural sag in a leash so that if the dog should reverse direction and take the tension off the leash, it will not become entangled and catch between his legs. This, then, prevents injury to the animal when moving suddenly in a different direction.

A further particular advantage of this new and improved helical leash is that it will extend to its maximum limit, perhaps as long as 6 to 9 feet, keeping a relatively constant tension upon the leash, as well as having improved characteristics in controlling the animal with respect to the direction in which the animal moves, if this is desirable.

An object of this invention is to provide a new and improved leash incorporating holding means or a handle, such as a loop handle, together with a catch or other fastening means, and also incorporating between the body proper of the leash a helical spring coil surrounded by an abrasion-resistant material covering to provide a relatively constant tension on an animal.

A further object of this invention is to provide a new and improved leash incorporating a helical spring coil to overcome the natural sag of a leash.

Another object of this invention is to provide a new and improved animal leash having substantially uniform tension from its coiled length to its uncoiled length providing easy extension of the leash and at the same time having sufficient spring tension to overcome the natural sag from the weight of the extended leash.

Another object of this invention is to incorporate in an animal leash having a helical spring coil a moderate amount of rotational pressure so that by means of a handle the animal may be guided as to direction.

To the accomplishment of the foregoing and related ends, said invention, then, consists of the means hereinafter fully described and particularly pointed out in the claims; the following description setting forth in detail one approved method of carrying out the invention, such disclosed method, however, constituting but one of the various ways in which the principles of the invention may be used.

In the drawings:

Fig. 1 is a schematic view of the dog leash showing the handle structure and the loop in a partially extended position;

Fig. 2 is a partial view of the leash drawn to an enlarged scale showing the handle, the snap hook and the helical spring coil therebetween;

Fig. 3 is an enlarged cross-sectional view of the helical spring coil in one modification along the line 3—3 of Fig. 2; and Fig. 4 is an enlarged cross-sectional view of an alternate modification of the helical spring coil along the line 3—3 of Fig. 2.

In connection with the drawings, Fig. 1 is a schematic view of a helical spring coiled leash shown generally at 10 having a handle means 11 which is controlled by a hand 12. There is a fastening means 13 for rigidly securing the handle means to one end of the helical spring coil and the handle means may include a loop handle 14. A snap hook is shown generally at 15 having a shank portion 16 rigidly secured to the opposite end of the helical spring coil 10, and a hook portion 17 with a spring catch 18.

Figs. 3 and 4 show two modifications of the animal leash and the helical spring coil. Fig. 3 shows an outer covering of abrasion-resistant material 18a, and the cylindrical spring steel center core is shown at 19. In the modification shown in connection with Fig. 4 a flat or rectangular spring wire is shown at 20. Surrounding said spring wire a material covering of insulated material 21 is adapted to resist the abrasion and prevents cutting when coming in contact with various objects.

In general in connection with this invention, it will be seen that the coiled form of the leash may be, for example, 2 feet, though longer or shorter dimensions may be used, and the uncoiled form fully extended may be 6 to 9 feet, depending upon the size of the coil. The diameter of the spring coil may vary from 1 inch to 2 inches, and the pitch can be from ½ inch to 1½ inches, depending upon the desired characteristics. The tension in the coil is not large and it is not intended to be large. That is to say, this is not a device for preventing the animal from injuring itself in lunging. These devices always reach their end and though some of the force may be dissipated, a strong lunge would injure the animal under certain conditions. That idea is not meant to be incorporated in this invention, and the tension in the cord is to prevent it from sagging and dragging on the ground as normal animal leashes do, and to prevent the animal from reversing directions, if desired. The cord also will not get tangled around miscellaneous objects, such as curbstones and bushes, and the cord will not become entangled and kink. The animal will normally pull upon this leash with sufficient pressure so that it will be relatively taut and will not hang loose to become entangled between the animal's legs.

In leading the animal the loop handle may be held loosely or if directional characteristics are desired, it may be twisted to transmit a rotational pressure or force to the helical spring coil with the idea that this pressure will be transmitted through the spring coil to indicate to the animal the directional motion desired. This rotational or torsional stiffness of the coil spring may be designed into the leash by the characteristics of the loop as, for example, shown in Figs. 3 and 4.

Other spring characteristics may be designed so that the helical spring coil has substantially uniform tension from the coil length to the uncoiled length. This gives the full freedom of action and at the same time does not give such a hefty spring that there is increased pull upon the leash or upon the handle as the coil extends.

Although the present invention has been described in connection with a few preferred embodiments thereof, variations and modifications may be resorted to by those skilled in the art without departing from the principles of the invention. All of these variations and modifications are considered to be within the true spirit and scope of the present invention as disclosed in the foregoing description and defined by the appended claims.

I claim:

1. An animal leash comprising a central portion having a helical spring coil throughout substantially the entire length thereof, the adjacent convolutions of the spring being in closely disposed relationship with each other when the spring is in relaxed condition, animal collar attaching means, torsion transmitting means securing said attaching means to one end of said central helical spring coil portion for transmission of torsional loads from said spring coil portion to said attaching means, tension and torsional control means, torsion transmitting means securing said tension and torsional control means to the opposite end of the helical spring coil for transmission of torsional loads from said tension and torsional control means to said spring coil, and for holding and controlling an animal having a collar to which the opposite end of the spring coil is connected, said helical spring coil having substantial torsional stiffness whereby opposite torsional force may be transmitted from the control means to the collar of an animal to which the leash is attached, said spring coil further having sufficient resistance to lateral deformation to substantially preclude any natural tendency of the spring coil to sag when in use.

2. The animal leash described in claim 1 in which the helical spring coil has substantially uniform resistance to tension from a substantially fully coiled condition to a substantially fully extended condition, said coiled spring being provided with an abrasion-resistant surface covering.

3. The animal leash of claim 1 in which the helical spring coil is of cylindrical cross section.

4. The animal leash of claim 1 in which the helical spring coil is substantially of rectangular cross section.

References Cited in the file of this patent

UNITED STATES PATENTS

| | | |
|---|---|---|
| D. 124,073 | Gottlieb | Dec. 17, 1940 |
| 444,975 | Davisson | Jan. 20, 1891 |
| 474,845 | Mayell | May 17, 1892 |
| 483,762 | Crippen | Oct. 4, 1892 |
| 534,492 | Baker | Feb. 19, 1895 |
| 582,003 | Sweet | May 4, 1897 |
| 741,232 | Davidson | Oct. 13, 1903 |
| 831,537 | Cornell | Sept. 25, 1906 |
| 913,680 | Belcher | Mar. 2, 1909 |
| 1,509,781 | Roth | Sept. 23, 1924 |
| 1,586,353 | Colegrove | May 25, 1926 |
| 1,730,945 | Poole | Oct. 8, 1929 |
| 1,924,596 | Davis | Aug. 29, 1933 |
| 2,060,913 | Weaver | Nov. 17, 1936 |
| 2,194,736 | De Bruler | Mar. 26, 1940 |
| 2,314,503 | Lifchultz | Mar. 23, 1943 |
| 2,428,875 | Hantz | Oct. 14, 1947 |
| 2,593,940 | Van Meter | Apr. 22, 1952 |
| 2,623,498 | Gustavsson | Dec. 30, 1952 |
| 2,698,598 | Hadley | Jan. 4, 1955 |
| 2,737,154 | Michonski | Mar. 6, 1956 |

FOREIGN PATENTS

| | | |
|---|---|---|
| 624,625 | Great Britain | June 14, 1949 |